United States Patent [19]
Tanaka et al.

[11] Patent Number: 6,100,812
[45] Date of Patent: Aug. 8, 2000

[54] COMMUNICATION CONTROL METHOD, COMMUNICATION SYSTEM AND ELECTRONIC EQUIPMENT USED FOR IT

[75] Inventors: Tomoko Tanaka, Kanagawa; Makoto Sato; Harumi Kawamura, both of Tokyo; Hisato Shima, Kanagawa, all of Japan

[73] Assignee: Sony Corporation, Tokyo, Japan

[21] Appl. No.: 08/864,899

[22] Filed: May 29, 1997

[30] Foreign Application Priority Data

Jun. 4, 1996 [JP] Japan .................................. 8-141619

[51] Int. Cl.[7] .................................................. G08B 5/22
[52] U.S. Cl. ........................ 340/825.37; 340/825.06; 340/825.07; 340/825.25; 340/825.52; 340/825.69; 340/10.1; 709/217; 709/218; 709/219; 709/224; 709/225
[58] Field of Search ...................... 340/825.37, 825.06, 340/825.07, 825.25, 825.52, 825.54, 825.69; 395/200.54, 200.55, 200.59, 200.47, 200.48, 200.49; 709/219, 217, 218, 224, 225

[56] References Cited

U.S. PATENT DOCUMENTS

| | | | |
|---|---|---|---|
| 4,746,919 | 5/1988 | Reitmeier | 340/825.56 |
| 5,689,244 | 11/1997 | Iijima et al. | 340/825.07 |
| 5,745,068 | 4/1998 | Takahashi et al. | 340/825.69 |
| 5,760,698 | 6/1998 | Iijima et al. | 340/825.07 |
| 5,778,367 | 7/1998 | Wesinger, Jr. et al. | 395/200.47 |

OTHER PUBLICATIONS

"Device Drivers via the Access Bus" IBM Technical Disclosure Bulletin, US, IBM Corp. New York, vol. 39, No. 1, Jan. 1, 1996, p. 135 XP000556349.

"Video Electronics Standards Association Display Data Channel–1 Capability on XGA–2 Sub–Systems" IBM Technical Disclosure Bulletin, US, IBM Corp. New York, vol. 38, No. 3, Mar. 1, 1995, p. 19 XP000507964.

*Multiple Printer Objects from a Cascade Menu* IBM Technical Disclosure Bulletin, US, IBM Corp. New York, vol. 37, No. 9, Sep. 1, 1994, pp. 487–489 XP000473481.

Mines, R F; Friesen J A; Yang C L: *"DAVE: A Plug and Play Model for Distributed Multimedia Application Development"* Proceedings ACM Multimedia '94, Proceedings of ACM Multimedia '94, Oct. 15–20, 1994, pp. 22–28, XP002125719, San Francisco, CA.

Larsen A K: *"The Next Web Wave: Network Management"* Data Communications, US, McGraw Hill, New York, vol. 25, No. 1, Jan. 1, 1996, pp. 31–32, 34, XP000545237.

*Primary Examiner*—Brian Zimmerman
*Assistant Examiner*—Yves DaLencourt
*Attorney, Agent, or Firm*—Frommer Lawrence & Haug, LLP.; William S. Frommer; Joe H. Shallenburger

[57] ABSTRACT

To satisfactorily control electronic equipment on the controlled side by electronic equipment on the controlling side without useless processing. The controlled electronic equipment is provided with memory means for storing icon information and functional information. Controlling electronic equipment sends a command requesting icon information and functional information to the controlled electronic equipment and obtains information as a response. The controlling electronic equipment displays icons showing the controlled electronic equipment on a display based upon the icon information. The controlling electronic equipment displays a control panel displaying functions with which the controlled electronic equipment is provided in the format of a button and others on the display based upon the functional information. The controlling electronic equipment is not required to inquire of the controlled electronic equipment whether the functions displayed on the panel correspond to the functions of them or not and a user can operate any function of the controlled electronic equipment on the panel.

27 Claims, 8 Drawing Sheets

CSP : CYCLE START PACKET
ISO : ISOCHRONOUS COMMUNICATION PACKET
ASYNC : ASYNCHRONOUS COMMUNICATION PACKET

| | CTS | CT/RC | HA | OPC | OPR | OPR | OPR |
|---|---|---|---|---|---|---|---|
| FIG. 11A COMMAND FORMAT | "0"H | REQUEST TYPE | DESTINATION IN EQUIPMENT | COMMAND | PARAMETER 1 | PARAMETER 2 | PARAMETER 3 |
| FIG. 11B RESPONSE FORMAT | "0"H | RESPONSE TYPE | SENDER IN EQUIPMENT | PROCESSING COMMAND | PARAMETER 1 | PARAMETER 2 | PARAMETER 3 |
| FIG. 11C COMMAND TO VTR | "0"H | CONTROL | VTR SUBDEVICE | DO 'PLAY' | 'SLOW' | | |
| FIG. 11D RESPONSE FROM VTR | "0"H | ACCEPTED | VTR SUBDEVICE | DO 'PLAY' | 'SLOW' | | |
| FIG. 11E RESPONSE FROM VTR | "0"H | NOT-IMPLE MENTED | VTR SUBDEVICE | DO 'PLAY' | 'SLOW' | | |

COMMUNICATION CONTROL METHOD, COMMUNICATION SYSTEM AND ELECTRONIC EQUIPMENT USED FOR IT

BACKGROUND OF THE INVENTION

1. Field of the Invention

The present invention relates to a communication control method, a communication system and electronic equipment used for it when communication is performed between plural electronic equipment connected via a communication control bus which can transmit a control signal with it mixed with an information signal such as a serial bus according to IEEE 1394. In detail, the present invention relates to a communication control method and others for satisfactorily controlling electronic equipment on the controlled side by electronic equipment on the controlling side without useless processing by enabling requesting peculiar information such as functional information and icon information from electronic equipment on the controlling side to electronic equipment on the controlled side.

2. Description of the Related Art

A communication system for connecting plural electronic equipment via a communication control bus which can transmit a control signal with it mixed with an information signal such as a serial bus according to IEEE 1394 (hereinafter called IEEE-1394 serial bus) and communicating a control signal and an information signal between these plural electronic equipment is proposed.

FIG. 7 shows an example of a communication system in which plural electronic equipment is connected via IEEE-1394 serial bus.

This communication system 30 is provided with a video tape recorder 31 (hereinafter called VTR), a video tape recorder integrated with a camera 32 (hereinafter called camcorder) and a computer 33 for controlling VTR 31 and the camcorder 32. VTR 31 is connected to the computer 33 via IEEE-1394 serial bus 34 and the camcorder 32 is connected to the computer 33 via IEEE-1394 serial bus 35. A display 33a, a keyboard 33b and a mouse 33c are connected to the computer 33 for a user interface. #A to #C respectively denote the node identification (ID) in the system of the computer 33, the camcorder 32 and VTR 31.

A signal is transmitted between each electronic equipment in the system every predetermined communication cycle as shown in FIG. 8, for example 125 $\mu$ sec according to time division multiplexing. This transmission of a signal is started by sending a cycle start packet (CSP) showing when electronic equipment called a cycle master should start a communication cycle over a bus.

There is isochronous communication for isochronously transmitting an information signal such as video data and audio data and asynchronous communication for asynchronously transmitting a control signal such as a control command for the type of communication in one communication cycle. An isochronous communication packet is transmitted earlier than an asynchronous communication packet. Plural isochronous data can be differentiated by allocating channel numbers 1, 2, 3, - - - n to each of isochronous communication packets. After the sending of isochronous communication packets is finished, a period till the next cycle start packet is used for the transmission of an asynchronous communication packet.

In asynchronous communication, a control signal in which electronic equipment makes a request to another electronic equipment for something is called a command and equipment on the side of sending this command with it included in a packet is called a controller. Equipment on the side of receiving a command is called a target. The target returns a control signal showing the result of the execution of a command if necessary, that is, a packet including a response to the controller.

These command and response are communicated between one controller and one target and a series of communication started by sending a command and finished by returning a response is called command.transaction. It is determined that the target should return a response as soon as possible after it receives a command, for example within 100 msec. The reason is that processing is delayed when the controller continues waiting for a response for a long time and processing is left undone if no response is returned due to any trouble.

The controller can request the target to execute specific operation and inquire of the target the current state by command transaction. Any electronic equipment in the system can start and finish command transaction. That is, any electronic equipment can function as a controller and a target.

FIG. 9 shows the structure of an asynchronous communication packet. A command and a response have the same structure. As shown in FIG. 9, data in a packet is transmitted downward from the top and from the left to the right in order. A packet is constituted by a packet header and a data block. The standard of the whole packet header and data CRC (a part in which halftone dots are formed) in the data block is determined according to IEEE 1394 and the contents of the data block are written to an address shown by a destination offset between electronic equipment shown by source identification (ID) in the packet header and electronic equipment shown by destination identification (ID).

For example, if a command is sent from the computer 33 to VTR 31 in the communication system 30 shown in FIG. 7, source ID is equivalent to #A, destination ID is equivalent to #C and a destination offset is in memory room allocated as an area for storing a command in VTR 31. If the computer 33 sends a command to any other electronic equipment in the system, any of 16 bits in destination ID is set to '1'. This type of communication is called a broadcast.

A command transaction set (CTS) in the data block in the structure of the asynchronous communication packet shown in FIG. 9 denotes the type of a command language. A command type/A response code (CT/RC) denotes a request in the case of a command and the type of an answer to the request in the case of a response. A header address (HA) denotes which of the whole equipment or a subdevice (in units of function) in equipment requested equipment is in the case of a command and a response is similar to the corresponding command in meaning that requested equipment gives an answer in the case of a response. An operation code (OPC) denotes a command code, that is, a concrete request and the following operand (OPR) denotes a parameter required for the request.

FIG. 10 shows the configuration of a section for communicating the above command and response with VTR 31 of electronic equipment in the system as an example. This VTR 31 is provided with a VRT device 36 and an IEEE-1394 bus sending/receiving block 37.

The VTR device 36 is constituted by a microcomputer and provided with a VTR subdevice 38 for processing a command related to a recording/reproducing system not shown in VTR, a tuner subdevice 39 for processing a command related to a tuner not shown in VTR and a timer subdevice 40 for processing a command related to a timer not shown in VTR. These subdevices 38 to 40 are constituted by the software of the microcomputer.

The IEEE-1394 bus sending/receiving block 37 detects an asynchronous communication packet received via the bus and sends a command included in it to the VTR device 36. When the VTR device 36 receives the command, any of the subdevices 38 to 40 is operated according to the concrete request. For example, if PLAY command addressed to the VTR subdevice 38 is received, the command is passed to the VTR sub device 38. The VTR subdevice 38 execute s processing for con trolling so that the recording/reproducing system is reactivated.

Also, for example, the VTR subdevice 38 monitors various statuses such as a mechanical mode and a time code of the recording/reproducing system and makes a response if necessary. This response is sent from the VTR device 36 to the IEEE-1394 bus sending/receiving block 37. The IEEE-1394 bus sending/receiving block 37 sends the response with it included in an asynchronous communication packet to the bus.

FIG. 11A shows the format configuration of a command and FIG. 11B shows the format configuration of a response. In these cases, CTS is "0" h.

For the type of a request in a command currently defined, that is, a command type, there are four types of (1) CONTROL command for controlling the execution of a function of a communication target, (2) INQUIRY command for inquiring whether a communication target corresponds to specific CONTROL command or not, (3) STATUS command for inquiring a status related to the specific function of a communication target and (4) NOTIFY command for requesting the report if the status of a communication target is varied.

For example, the format of CONTROL command for requesting slow reproduction for the VTR subdevice 38 of VTR 31 shown in FIG. 10 is equal to the format shown in FIG. 11C. In the meantime, the format of a response returned from the VTR subdevice 38 is equal to the format of ACCEPTED response shown in FIG. 11D when the format of the response corresponds to the CONTROL command and the request is accepted and in the meantime, when the format of the response does not correspond to the CONTROL command, it is equal to the format of NOT-IMPLEMENTED response shown in FIG. 11E.

If a computer controls a communication system in which plural audio-visual (AV) equipment is connected to the computer as in the communication system 30 shown in FIG. 7, an icon showing each equipment and a control panel for controlling predetermined equipment are displayed on a display and a user is encouraged to operate.

In this case, the above icon and control panel are prepared by an application program of the computer. Functions with which controlled equipment is provided are displayed in the format of a button and others on the control panel and the computer sends a predetermined command for controlling so that the corresponding function is executed by operating a button to the controlled equipment.

However, actually connected equipment does not necessarily correspond to all functions displayed on the control panel. Therefore, the computer is required to inquire of controlled equipment whether each function displayed on the control panel corresponds to the controlled equipment or not and to reflect the response upon the execution of its own application program. If the application program does not correspond to any of functions with which controlled equipment is provided, the function cannot be operated on the control panel.

SUMMARY OF THE INVENTION

Therefore, the object of the present invention is to satisfactorily control electronic equipment on the controlled side by electronic equipment on the controlling side without useless processing.

A communication control method according to the present invention is characterized in that in a system for communicating a control signal between plural electronic equipment, at least a part of the plural electronic equipment is provided with memory means for storing peculiar information and in that when a command requesting peculiar information is sent from first electronic equipment which is electronic equipment on the controlling side to second electronic equipment which is provided with the memory means and is electronic equipment on the controlled side, the second electronic equipment reads the peculiar information from the memory means and returns it to the first electronic equipment as a response.

Also, a communication system according to the present invention for communicating a control signal between plural electronic equipment is characterized in that at least a part of plural electronic equipment is provided with memory means for storing peculiar information, in that first electronic equipment which is electronic equipment on the controlling side is provided with command sending means for sending a command requesting peculiar information to second electronic equipment which is electronic equipment on the controlled side and in that if the second electronic equipment is provided with the memory means, it is provided with response returning means for receiving the command, reading the peculiar information from the memory means and returning it to the first electronic equipment as a response.

Also, electronic equipment according to the present invention is electronic equipment used in the communication system for communicating a control signal between plural electronic equipment and is provided with command sending means for sending a command requesting peculiar information to electronic equipment on the controlled side.

Also, electronic equipment according to the present invention is electronic equipment used in the communication system for communicating a control signal between plural electronic equipment and provided with memory means for storing peculiar information and response returning means for reading the peculiar information from the memory means when a command requesting the peculiar information is received and returning it to the above electronic equipment on the controlling side as a response.

A control signal is communicated between plural electronic equipment. For example, plural electronic equipment is connected via a communication control bus which can transmit a control signal with it mixed with an information signal, and an information signal and a control signal are communicated between the plural electronic equipment.

At least a part of plural electronic equipment is provided with memory means for storing peculiar information, for example functional information displaying its own functions, icon information for displaying an icon showing itself on a display and others. The functional information includes display information for displaying the functions for example on a display.

The first electronic equipment which is electronic equipment on the controlling side sends a command requesting peculiar information to the second electronic equipment which is electronic equipment on the controlled side. When the second electronic equipment is provided with memory means for storing peculiar information, it reads the peculiar information from the memory means and returns the peculiar information to the first electronic equipment as a response.

When peculiar information returned from the second electronic equipment is functional information for example, the first electronic equipment displays a control panel provided with the functions of the second electronic equipment in the format of a button and others based upon the functional information on the display. When a user presses a button, a command for executing the corresponding function is sent from the first electronic equipment to the second electronic equipment.

Also, when peculiar information returned from the second electronic equipment is icon information for example, the first electronic equipment displays an icon showing the second electronic equipment on the display based upon the icon information.

Also, when peculiar information returned from the second electronic equipment is the home page address information of the Internet for example, the first electronic equipment accesses the home page of the Internet based upon the home page address information and obtains predetermined information, for example the functional information and the icon information of the second electronic equipment. The first electronic equipment displays a control panel provided with the functions of the second electronic equipment in the format of a button and others and an icon showing the second electronic equipment on the display based upon the functional information and the icon information.

BRIEF DESCRIPTION OF THE DRAWINGS

FIG. 11 shows the format configuration of a command and a response.

DETAILED DESCRIPTION OF THE PREFERRED EMBODIMENT

Figure 1:
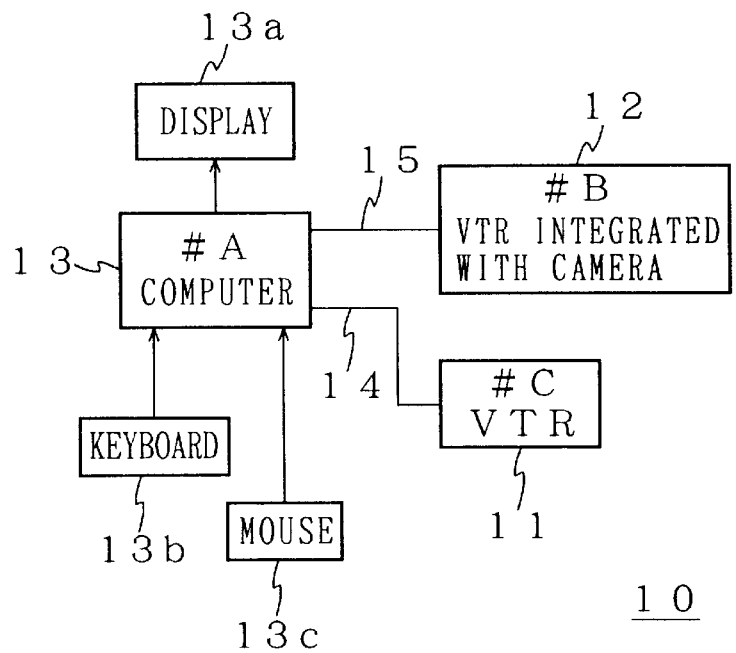
FIG. 1 is a block diagram showing a communication system equivalent to a first embodiment.

Referring to drawings, embodiments according to the present invention will be described below. FIG. 1 shows a communication system 10 equivalent to a first embodiment. This communication system 10 is also constituted by connecting plural electronic equipment via IEEE-1394 serial bus as the above communication system 30 shown in FIG. 7.

This communication system 10 is provided with a video tape recorder (VTR) 11, a video tape recorder integrated with a camera (camcorder) 12 and a computer 13 for controlling the VTR 11 and the camcorder 12. The VTR 11 is connected to the computer 13 via IEEE-1394 serial bus 14 and the camcorder 12 is connected to the computer 13 via IEEE-1394 serial bus 15. A display 13a, a keyboard 13b and a mouse 13c are connected to the computer 13 for a user interface. "#A" to "#C" in FIG. 1 respectively denote the node identification (ID) of the computer 13, the camcorder 12 and the VTR 11 in the system.

Figure 7:
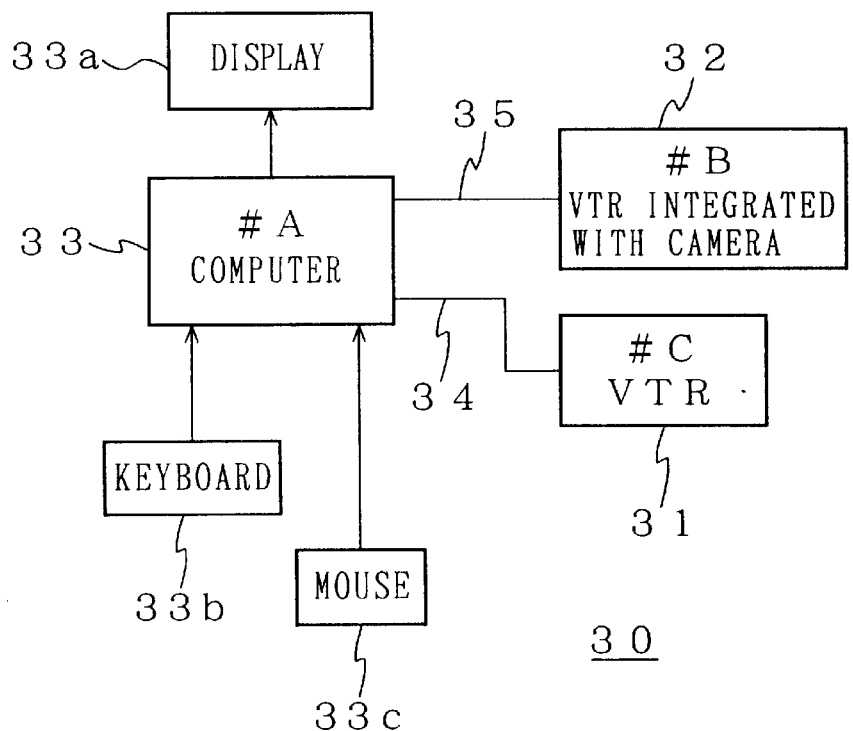
FIG. 7 is a block diagram showing an example of a communication system in which plural electronic equipment is connected via IEEE-1394 serial bus.
Figure 8:
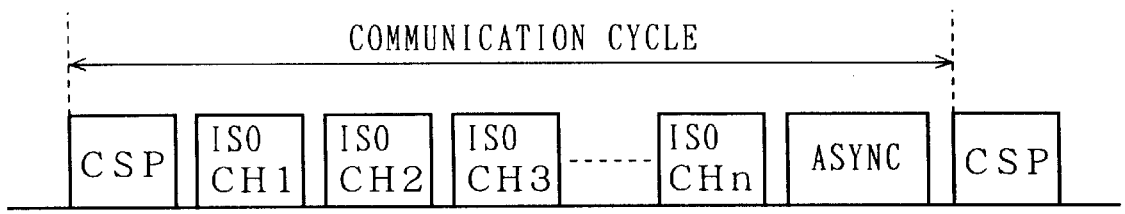
FIG. 8 shows an example of the structure of data over a bus in the communication system using IEEE-1394 serial bus.
Figure 9:
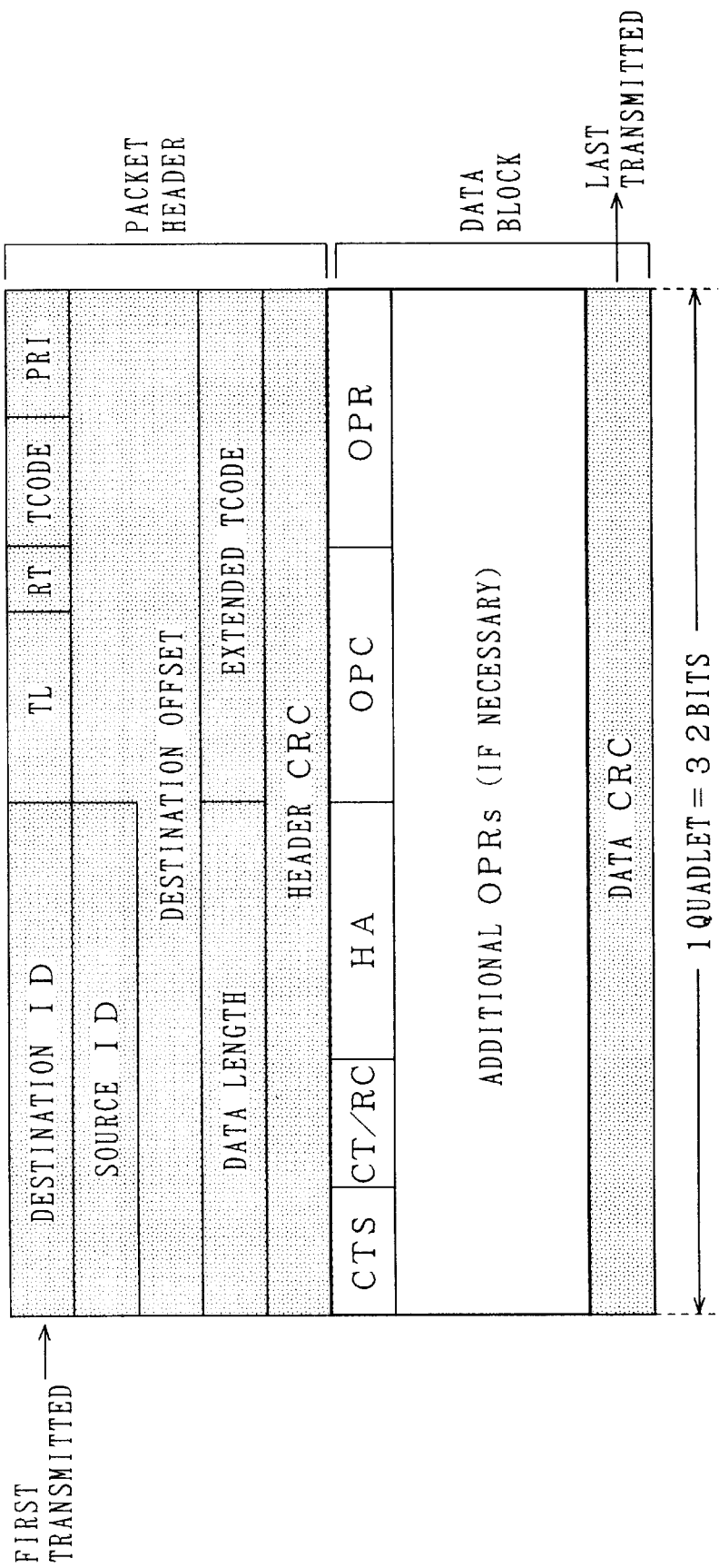
FIG. 9 shows the structure of an asynchronous communication packet.
Figure 10:
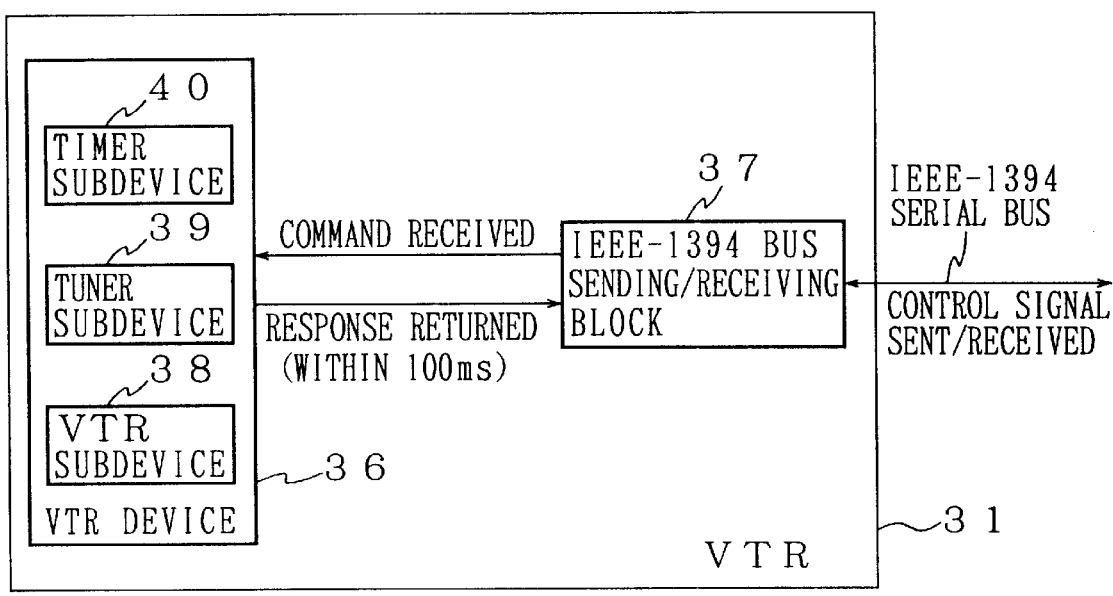
FIG. 10 shows the section for communicating a command and a response of the VTR constituting the communication system using IEEE-1394 serial bus.

In the system, a signal is transmitted from/to each electronic equipment every predetermined communication cycle according to time division multiplexing as in the above communication system 30 shown in FIG. 7, an information signal such as video data and audio data is transmitted in an isochronous communication packet format and a control signal such as a control command is transmitted in an asynchronous communication packet format as shown in FIG. 8. If electronic equipment on the controlling side (a controller) makes a request to electronic equipment on the controlled side (a target) for any, the controller sends an asynchronous communication packet (the structure is shown in FIG. 9) including a command (the format is shown in FIG. 11A) to the target. The target sends back a response (the format is shown in FIG. 11B) including the result of the execution of the command if necessary to the controller.

Figure 2:
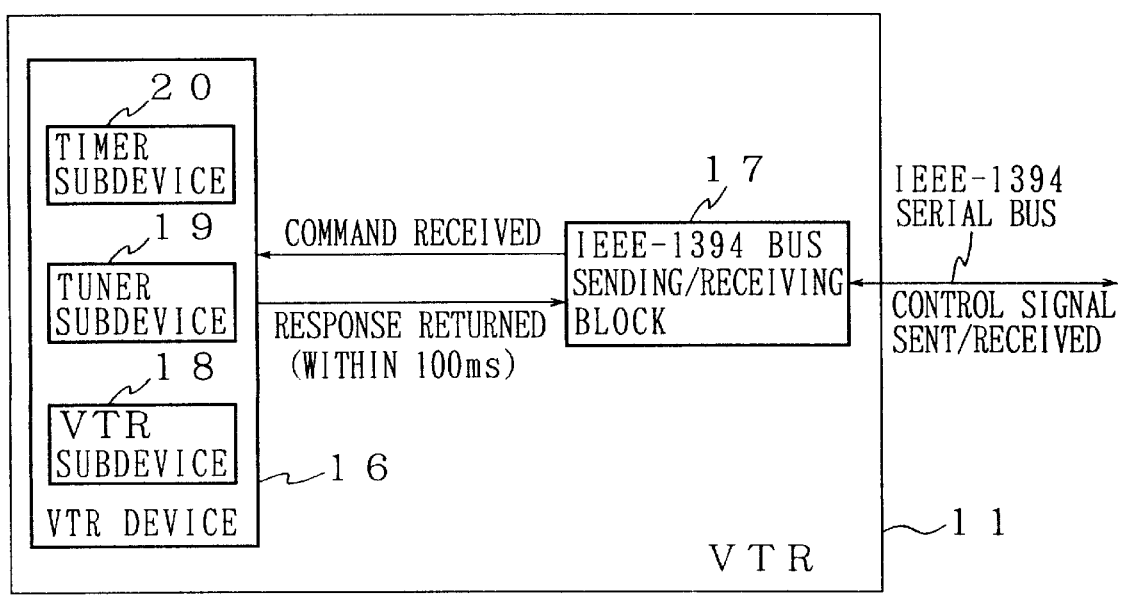
FIG. 2 shows the section for communicating a command and a response of the VTR constituting the communication system equivalent to the first embodiment.

FIG. 2 shows the constitution of a section for communicating the above command and response in the VTR 11 for example of electronic equipment in the system. This VTR 11 is provided with a VTR device 16 and an IEEE-1394 bus sending/receiving block 17 as VTR 31 in the communication system 30 shown in FIG. 7.

The VTR device 16 is constituted by a microcomputer and provided with a VTR subdevice 18 for processing a command related to a recording/reproducing system not shown in VTR, a tuner subdevice 19 for processing a command related to a tuner not shown in VTR and a timer subdevice 20 for processing a command related to a timer not shown in VTR. These subdevices 18 to 20 are constituted by the software of the microcomputer.

The IEEE-1394 bus sending/receiving block 17 detects an asynchronous communication packet received via the bus and sends a command included in it to the VTR device 16. When the VTR device 16 receives the command, it operates the subdevices 18 to 20 according to its concrete request. The subdevices 18 to 20 monitor each status and make a response if necessary. This response is sent from the VTR device 16 to the IEEE-1394 bus sending/receiving block 17. The IEEE-1394 bus sending/receiving block 17 sends an asynchronous communication packet including the response via the bus.

In this embodiment, an editing application program is installed in the computer 13 and a user can edit by controlling the VTR 11 and the camcorder 12 by operating a control panel displayed on the display 13a. An individual function provided to the VTR 11 and the camcorder 12 is shown in a format consisting of a button and others on the control panel displayed on the display 13a.

The VTR 11 and the camcorder 12 are respectively provided with memory means for storing functional information showing functions provided to each equipment as peculiar information and icon information for displaying an icon showing each equipment. The computer 13 sends a command requesting the above icon information and functional information to the VTR 11 and the camcorder 12 in editing. In the meantime, the VTR 11 and the camcorder 12 return each icon information and functional information to the computer 13 as a response.

A case in which a command requesting icon information and functional information is sent from the computer 13 to the VTR 11 in the communication system 10 shown in FIG. 1 will be described below.

Figure 3:
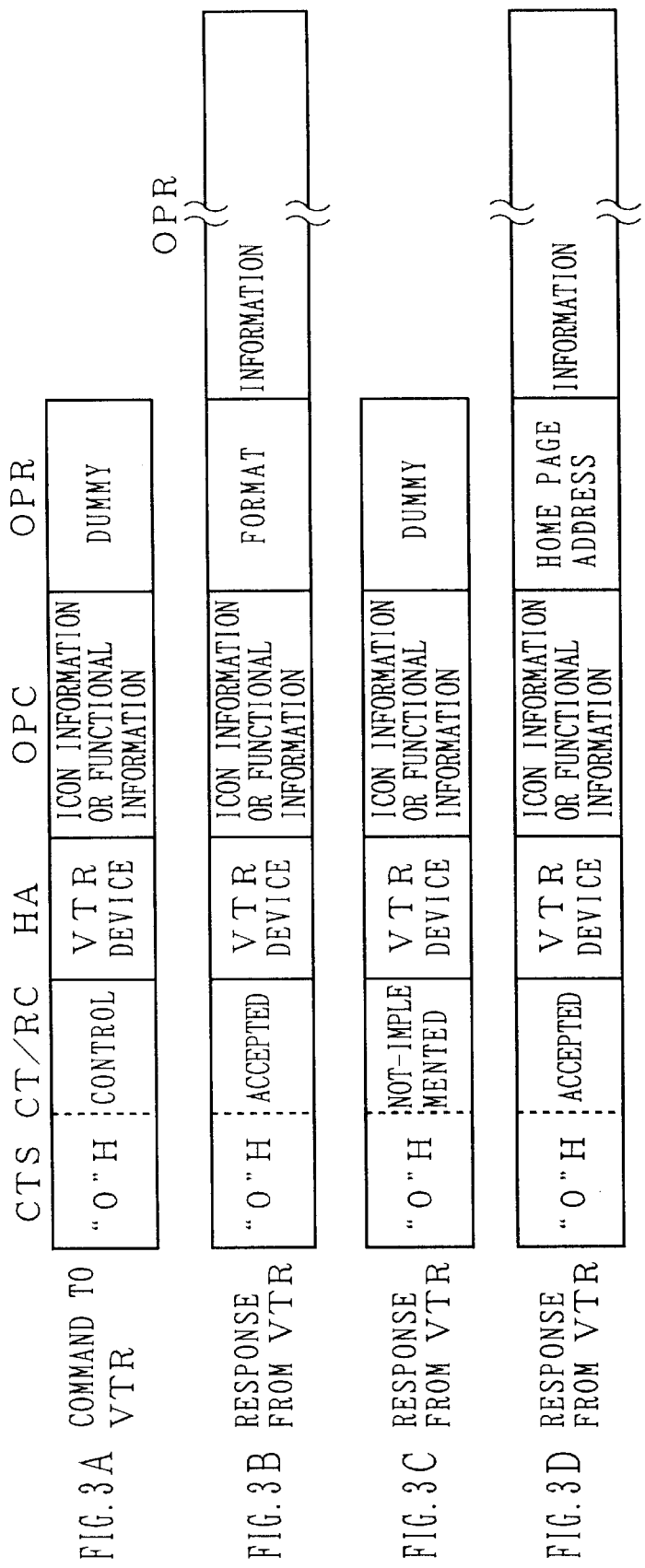
FIG. 3 shows the format configuration of a command and a response when icon information and functional information are requested.

In this case, the format of a CONTROL command first sent from the computer 13 to the VTR 11 is shown in FIG. 3A. In the meantime, the format of a response returned from the VTR device 16 of the VTR 11 to the computer 13 is equal to that of an ACCEPTED response shown in FIG. 3B. In the format of this response, OPR denotes icon information or functional information and the descriptive format of the information, for example a bit map format and a joint photographic experts group (JPEG) format and further, a language form for the Internet, for example a hypertext markup language (HTML), a virtual reality modeling language (VRML) and Java script (a script language developed by Sun and Netscape Communications Corp. (U.S.)).

As the VTR 11 cannot respond to the request of CONTROL command if the VTR 11 is not provided with memory means for storing icon information and functional information, the format of a response returned from the VTR device 16 of the VTR 11 to the computer 13 is equal to the format of NOT-IMPLEMENTED response shown in FIG. 3C.

The computer 13 which receives ACCEPTED response shown in FIG. 3B controls as follows: That is, when icon information is obtained, the computer controls so that an icon showing the VTR 11 is displayed on the display 13a based upon the icon information. When functional information is obtained, the computer controls so that a control panel displaying functions with which the VTR 11 is provided in the format of a button and others is displayed on the display 13a based upon the functional information. The display data of a control panel may be also included in functional information.

When a predetermined functional section on a control panel is operated by a user via a keyboard 13b or a mouse 13c in a state in which the control panel displaying functions with which the VTR 11 is provided in the format of a button and others is displayed on the display 13a as described above, the computer 13 sends the VTR 11 a command requesting the VTR 11 to execute the predetermined function.

Figure 4:
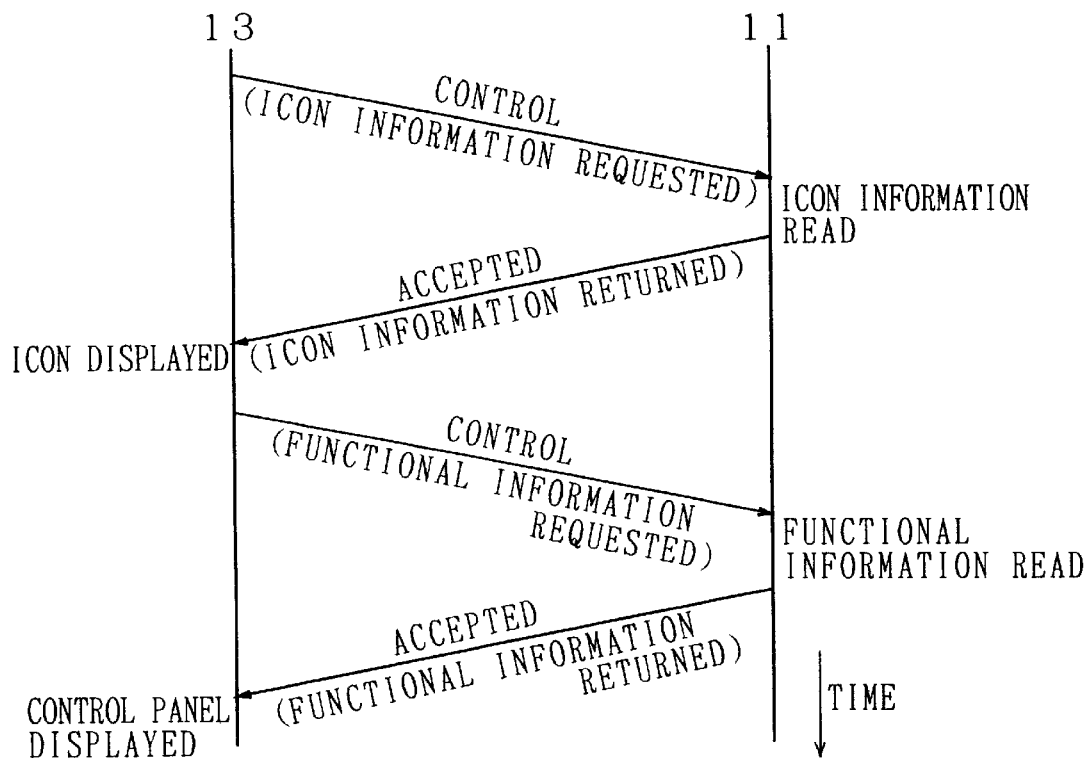
FIG. 4 shows an example of operation when a computer requests the VTR to send icon information and functional information.

FIG. 4 shows operation when the computer 13 sequentially requests the VTR 11 to send icon information and functional information in the communication system 10 shown in FIG. 1.

First, the computer 13 sends the VTR 11 CONTROL command requesting icon information. In the meantime, the VTR device 16 of the VTR 11 reads icon information from the memory means and returns the icon information to the computer 13 as ACCEPTED response. The computer 13 controls so that an icon showing the VTR 11 is displayed on the display 13a based upon the icon information.

Next, the computer 13 sends the VTR 11 CONTROL command requesting functional information. In the meantime, the VTR device 16 of the VTR 11 reads functional information from the memory means and returns the functional information to the computer 13 as ACCEPTED response. The computer 13 controls so that a control panel displaying functions with which the VTR 11 is provided in the format of a button and others is displayed on the display 13a based upon the functional information.

Figure 5:
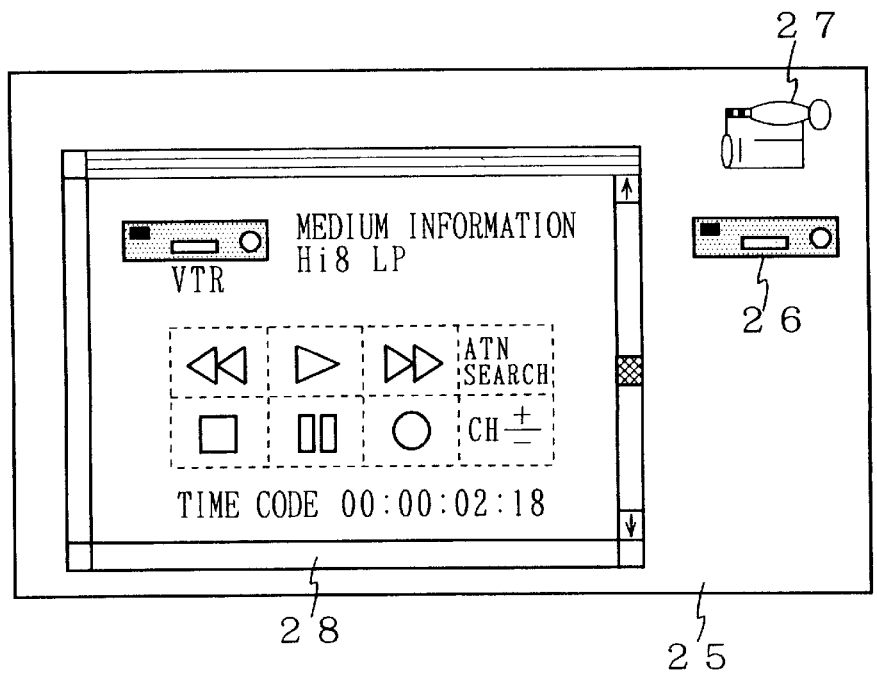
FIG. 5 shows an example in which an icon and a control panel are displayed on the display screen of a display.

A case in which a command requesting icon information and functional information is sent from the computer 13 to the VTR 11 is described above, however, the same communication is also performed in a case in which a command requesting icon information and functional information is sent from the computer 13 to the camcorder 12. FIG. 5 shows an example of a display screen 25 of the display 13a and concretely shows an icon 26 showing the VTR 11, an icon 27 showing the camcorder 12 and a control panel 28 displaying functions with which the VTR 11 is provided in the format of a button and others. A user can operate the VTR 11 on this control panel 28.

A control panel displaying functions with which the camcorder 12 is provided in the format of a button and others is displayed by clicking the icon 27 showing the camcorder 12 in this state in place of the control panel 28. Hereby, the user can operate camcorder on the control panel.

In the communication system 10 shown in FIG. 1 as described above, the computer 13 can request the VTR 11 and the camcorder 12 to send icon information and functional information and can display icons and control panels on the display 13a based upon the returned icon information and functional information.

Therefore, a function displayed on the control panel of the VTR 11 and the camcorder 12 which is displayed on the display 13a corresponds to an individual function with which the VTR 11 or the camcorder 12 is provided, the computer 13 is not required to inquire of the VTR 11 or the camcorder 12 whether the function displayed on the control panel corresponds to the individual function of them or not and a user can operate any function of the VTR 11 and the camcorder 12 on the control panel.

Figure 6:
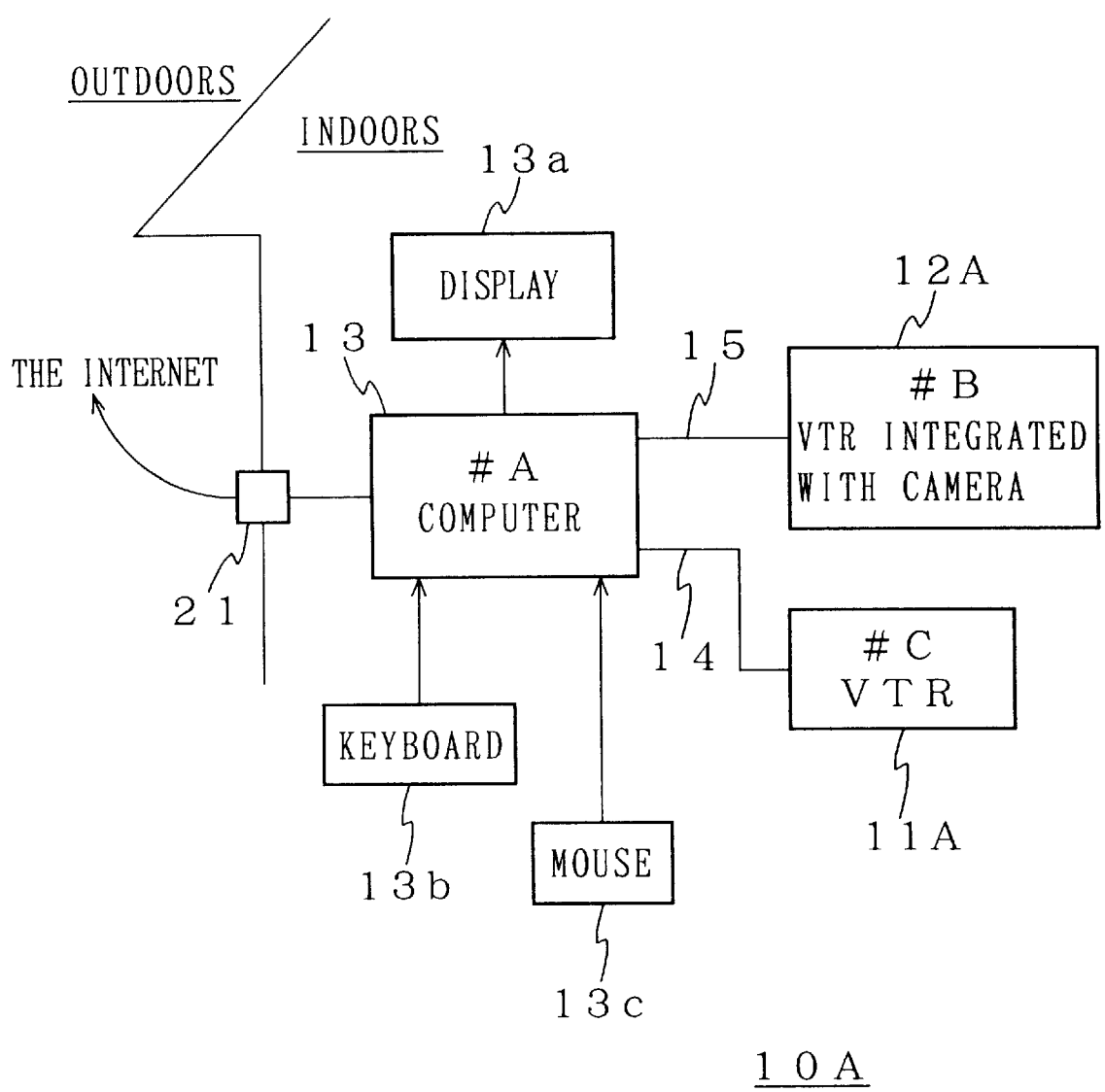
FIG. 6 is a block diagram showing a communication system equivalent to a second embodiment.

Next, a second embodiment will be described. FIG. 6 shows a communication system 10A equivalent to the second embodiment. This communication system 10A is also provided with the VTR 11A, a camcorder 12A and a computer 13 for controlling the VTR 11A and the camcorder 12A as the communication system 10 shown in FIG. 1. The VTR 11A is connected to the computer 13 via a serial bus 14 and the camcorder 12A is connected to the computer 13 via a serial bus 15. A display 13a, a keyboard 13b and a mouse 13c are connected to the computer 13 for a user interface. In this figure, #A to #C respectively denote the node identification (ID) in the system of the computer 13, the camcorder 12A and the VTR 11A. The detailed description is omitted, however, a signal is transmitted from/to each electronic equipment in the system as in the above communication system 10 shown in FIG. 1.

The computer 13 is connected to the Internet via a modem 21. The VTR 11A and the camcorder 12A are not provided with memory means for storing icon information and functional information as peculiar information differently from the VTR 11 and the camcorder 12 in the communication system 10 shown in FIG. 1 and instead, provided with memory means for storing the home page address information of the Internet for obtaining icon information and functional information as peculiar information. Another constitution of the VTR 11A and the camcorder 12A is similar to that of the VTR 11 and the camcorder 12.

In this embodiment, an editing application program is also installed in the computer 13 and a user can control the VTR 11A and the camcorder 12A by operating on a control panel displayed on the display 13a and edit.

The computer 13 sends the VTR 11 and the camcorder 12 a command requesting the above icon information and functional information in editing. In the meantime, the VTR 11A and the camcorder 12A return the home page address information of the Internet for obtaining icon information and functional information to the computer 13 as a response. The computer 13 accesses the home page of the Internet based upon the home page address information so as to obtain icon information and functional information. Hereby, as in the communication system 10 shown in FIG. 1, icons showing the VTR 11A and the camcorder 12A and a control panel displaying functions with which the VTR 11A and the camcorder 12A are provided in the format of a button and others can be displayed on the display 13a.

When icon information and functional information are requested, for example from the computer 13 to the VTR 11A, the format of CONTROL command first sent from the computer 13 to the VTR 11A is equal to a format shown in FIG. 3A. In the meantime, the format of a response returned from the VTR subdevice 18 of the VTR 11A to the computer 13 is equal to that of ACCEPTED response shown in FIG. 3D. OPR in the format of this response denotes the home page address information of the Internet for obtaining icon information and functional information. In case a command requesting icon information and functional information is sent from the computer 13 to the camcorder 12A, OPR also denotes the same.

As described above, in the communication system 10A shown in FIG. 6, the computer 13 can also request the VTR 11A and the camcorder 12A to send icon information and functional information and can also obtain their information based upon returned home page address information via the Internet and display an icon and a control panel on the display 13a. Therefore, the same action and effect as in the communication system 10 shown in FIG. 1 can be obtained. The VTR 11A and the camcorder 12A are not required to be provided with memory means for storing icon information and functional information and there is an advantage that the capacity of the memory can be saved.

In the above embodiments, communication systems in each of which the VTR and the camcorder are connected to the computer 13 via IEEE-1394 serial bus are disclosed, however, the present invention can be also similarly applied to another system in which a control signal is communicated between plural electronic equipment. In the second embodiment, the computer 13 obtains icon information and functional information based upon home page address information returned from the VTR 11A and the camcorder 12A via the Internet, however, similarly, the computer 13 can also obtain another peculiar information, for example the specifications of equipment and a method of handling it via the Internet and display the obtained information on the display 13a.

According to the present invention, peculiar information such as functional information and icon information can be requested from electronic equipment on the controlling side to electronic equipment on the controlled side. Therefore, a control panel can be displayed on the display of the electronic equipment on the controlling side for example based upon functional information returned from the electronic equipment on the controlled side, it is not required to be inquired of the electronic equipment on the controlled side whether functions displayed on the control panel correspond to the functions of the electronic equipment on the controlled side or not and any function of the electronic equipment on the controlled side can be operated on the control panel. Therefore, the electronic equipment on the controlled side can be satisfactorily controlled by the electronic equipment on the controlling side without useless processing.

What is claimed is:

1. A communication control method in a system for communicating a control signal between plural electronic equipments including controlled equipment and controlling equipment, said communication control method comprising:

providing said plural electronic equipment with memory means for storing particular information; and sending a command requesting said particular information from said controlling electronic equipment to controlled electronic equipment provided with said memory means, said controlled electronic equipment reading said particular information from said memory means and returning it to said controlling electronic equipment as a response.

2. A communication control method according to claim 1, wherein:

said plural electronic equipments are connected via a communication control bus which can transmit a control signal mixed with an information signal.

3. A communication control method according to claim 1, wherein:

said particular information is functional information showing the functions of said controlled electronic equipment; and said controlling electronic equipment controls said controlled electronic equipment based upon said functional information returned from said controlled electronic equipment.

4. A communication control method according to claim 3, wherein:

said controlling electronic equipment is provided with a display; and said function information includes display information for displaying the functions of said controlled electronic equipment on said display.

5. A communication control method according to claim 1, wherein:

said controlling electronic equipment is provided with a display;

said particular information is icon information for displaying an icon showing said controlled electronic equipment on said display; and said controlling electronic equipment displays the icon showing said controlled electronic equipment on said display based upon said icon information returned from said controlled electronic equipment.

6. A communication control method according to claim 1, wherein:

said particular information is the home page address information of the Internet; and said controlling electronic equipment obtains predetermined information by accessing the home page of said Internet based upon said home page address information.

7. A communication control method according to claim 1, wherein:

said particular information is described in a language for the Internet.

8. A communication system for communicating a control signal between plural electronic equipment, wherein:

at least some of said plural electronic equipment is provided with memory means for storing particular information;

controlling electronic equipment which is electronic equipment on the controlling side having command sending means for sending a command requesting said particular information to controlled electronic equipment which is electronic equipment on the controlled side; and if said controlled electronic equipment is provided with said memory means, it includes response returning means for receiving said command, reading said particular information from said memory means and returning it to said controlling electronic equipment as a response.

9. A communication system according to claim 8, wherein:
said plural electronic equipments are connected via a communication control bus which can transmit a control signal mixed with an information signal.

10. A communication system according to claim 8, wherein:
said particular information is functional information showing the functions of said controlled electronic equipment; and
said controlling electronic equipment is provided with control means for receiving said functional information returned from said controlled electronic equipment and controlling said controlled electronic equipment based upon this functional information.

11. A communication system according to claim 10, wherein:
said controlling electronic equipment is further provided with a display and function display means for displaying the functions of said controlled electronic equipment on said display based upon said functional information.

12. A communication system according to claim 11, wherein:
said functional information includes display information for displaying the functions of said controlled electronic equipment on said display.

13. A communication system according to claim 8, wherein:
said particular information is icon information for displaying an icon showing said controlled electronic equipment on said display; and
said controlling electronic equipment is provided with a display and icon display means for displaying the icon showing said controlled electronic equipment on said display based upon said icon information returned from said controlled electronic equipment.

14. A communication system according to claim 8, wherein:
said particular information is the home page address information of the Internet; and
said controlling electronic equipment is provided with Internet access means for obtaining predetermined information by accessing the home page of said Internet based upon said home page address information returned from said controlled electronic equipment.

15. Electronic equipment used in a communication system for communicating a control signal between plural electronic equipments, comprising:
memory means for storing particular information;
command sending means for sending a command requesting particular information stored in said memory means to electronic equipment on a controlled side; and
information sending means for returning said information to electronic equipment on a controlling side.

16. Electronic equipment according to claim 15, wherein:
said plural electronic equipments are connected via a communications control bus which can transmit a control signal mixed with an information signal.

17. Electronic equipment according to claim 15, wherein:
said particular information is functional information showing the functions of said electronic equipment on the controlled side; and
further comprising control means for receiving said functional information returned from said electronic equipment on the controlled side and controlling said electronic equipment on the controlled side based upon this functional information.

18. Electronic equipment according to claim 17, further comprising:
a display; and
function display means for displaying the functions of said electronic equipment on the controlled side on said display based upon said functional information.

19. Electronic equipment according to claim 17, wherein:
said functional information includes display information for displaying the functions of said electronic equipment on the controlled side on said display.

20. Electronic equipment according to claim 15, wherein:
said particular information is icon information for displaying an icon showing said electronic equipment on the controlled side on said display; and
further comprising a display and icon display means for displaying the icon showing said electronic equipment on the controlled side on said display based upon said icon information returned from said electronic equipment on the controlled side.

21. Electronic equipment according to claim 15, wherein:
said particular information is the home page address information of the Internet; and
and further comprising Internet access means for receiving the home page address information of said Internet returned from said electronic equipment on the controlled side and obtaining predetermined information by accessing the home page of said Internet based upon this home page address information.

22. Electronic equipment used in a communication system for communicating a control signal between plural electronic equipments, comprising:
memory means for storing particular information; and
response returning means for reading said particular information from said memory means when a command requesting said particular information is received and returning it to electronic equipment on the controlling side as a response.

23. Electronic equipment according to claim 22, wherein:
said plural electronic equipments are connected via a communication control bus which can transmit a control signal mixed with an information signal.

24. Electronic equipment according to claim 22, wherein:
said particular information is functional information showing its own functions.

25. Electronic equipment according to claim 24, wherein:
said functional information includes display information for displaying said its own functions on a display.

26. Electronic equipment according to claim 22, wherein:
said particular information is icon information for displaying an icon showing itself on a display.

27. Electronic equipment according to claim 22, wherein:
said particular information is home page address information of the Internet.

* * * * *